United States Patent [19]

Nottke

[11] 3,920,718

[45] Nov. 18, 1975

[54] METHOD OF MAKING α,α-DIFLUOROISOCYANATES

[75] Inventor: James E. Nottke, Greenville, N.C.

[73] Assignee: E. I. Du Pont de Nemours & Co., Wilmington, Del.

[22] Filed: July 22, 1974

[21] Appl. No.: 490,339

[52] U.S. Cl.... 260/453 P; 260/453 A; 260/453 AL; 260/453 AR
[51] Int. Cl.² .................................. C07C 118/00
[58] Field of Search.................................. 260/453 P

[56] References Cited
UNITED STATES PATENTS

| | | | |
|---|---|---|---|
| 3,118,923 | 1/1964 | Fawcett et al. | 260/453 |
| 3,666,784 | 5/1972 | Clifford et al. | 260/453 |

Primary Examiner—Lewis Gotts
Assistant Examiner—Dolph H. Torrence

[57] ABSTRACT

Organic compounds containing cyano groups react with carbonyl fluoride in the presence of a catalyst of mercuric oxide or mercuric flouride to convert —CN to —CF$_2$NCO groups in high yield.

4 Claims, No Drawings

METHOD OF MAKING α,α-DIFLUOROISOCYANATES

BACKGROUND OF THE INVENTION

1. Field of the Invention

This invention relates to an improved method of making α,α-difluoroisocyanates by the catalytic reaction of carbonyl fluoride with cyano groups.

2. The Prior Art

The α,α-difluoroisocyanates are a known class of compounds useful as waterproofing agents for textiles.

F. S. Fawcett, U.S. Pat. No. 3,118,923, teaches the reaction of saturated hydrocarbon as fluorocarbon nitriles with carbonyl fluoride at temperatures above 200°C. and in the presence of alkali metal cyanides as catalysts. In J. Am. Chem. Soc. 84 4277 (1962), Fawcett points out that the yields obtained by this procedure are low.

A. F. Clifford et al., U.S. Pat. No. 3,666,784, describe the reaction of organic nitriles with carbonyl fluoride in the presence of (anhydrous) hydrogen fluoride at temperatures from 0° to 80°C. Long reaction times are apparently required to obtain good yields.

SUMMARY OF THE INVENTION

The present invention is a method of making α,α-difluoroisocyanates by the reaction of organic nitriles with carbonyl fluoride characterized in that the reaction is conducted at a temperature of 50° to 250°C. in the presence of a catalyst consisting of mercuric oxide or mercuric fluoride

DETAILED DESCRIPTION OF THE INVENTION

The present invention is based on the discovery that the known reaction of carbonyl fluoride with organic nitriles to give α,α-difluoroisocyanates according to the equation

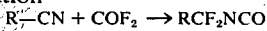
$$R\text{—}CN + COF_2 \rightarrow RCF_2NCO$$

is catalyzed by mercury compounds such as mercuric oxide and mercuric fluoride. The preferred catalyst is mercuric fluoride.

The reaction is applicable to a wide variety of organic compounds containing cyano groups; however, it is particularly useful for making α,α-difluoroisocyanates from hydrocarbons substituted with cyano groups and, optionally, halogen, particularly F, Cl and Br.

Preferred R groups are alkyl, cycloalkyl, aryl, or aralkyl groups of up to 20, and preferably up to 12 carbon atoms, or such groups substituted with F, Cl or Br.

In this specification, the term "aryl" is employed to refer to a radical formed from an aromatic hydrocarbon having as its only unsaturation at least one six-membered carbocyclic aromatic ring, by loss of a hydrogen atom from a nuclear carbon atom of an aromatic ring. The term thus includes such radicals as phenyl, naphthyl, phenanthryl, tolyl, xylyl, biphenylyl, and the like.

The term "aralkyl" is employed herein to refer to an aromatic hydrocarbon group having as its only unsaturation at least one six-membered carbocyclic aromatic ring and at least one alkyl substituent, by loss of a hydrogen atom from said alkyl substituent. Examples of aralkyl radicals are benzyl, β-phenylethyl and 1-naphthylmethyl.

The temperature at which the reaction is conducted is from about 50°C. to about 250°C., and preferably from 50°C. to 130°C.

This invention is further illustrated by the following specific embodiments which should not, however, be construed as fully delineating the scope thereof. In the examples, parts are by weight and temperatures are given in degrees centigrade.

EXAMPLE 1

α,α-Difluoroethyl Isocyanate

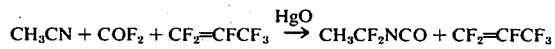
$$CH_3CN + COF_2 + CF_2\text{=}CFCF_3 \xrightarrow{HgO} CH_3CF_2NCO + CF_2\text{=}CFCF_3$$

A heavy glass tube (25 mm × 9 inches; 57 ml capacity) was charged with 0.5 g of mercuric oxide, 10 ml of dry acetonitrile, 8.6 g of hexafluoropropylene, and 7.0 g of carbonyl fluoride and sealed under vacuum. The tube was heated at 100° for 40 hours, cooled, opened, and the volatile material removed. Distillation of the volatile product gave a liquid identified by the following physical properties as α,α-difluoroethyl isocyanate, boiling at 20°–21°, strong infrared bands (gas) at 2290, 1200, and 940 cm$^{-1}$; PRM [sealed tube (s.t.) neat]: 1.98 ppm (triplet, J = 14.5 Hz); FMR (s.t. neat): —60 ppm (quartet, J = 14.5 Hz).

EXAMPLE 2

α,α-Difluoroethyl Isocyanate

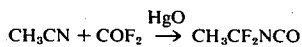
$$CH_3CN + COF_2 \xrightarrow{HgO} CH_3CF_2NCO$$

A heavy glass (25 mm × 9 inches) tube was charged with 0.5 g of mercuric oxide, 8 ml of acetonitrile, and 13 g of carbonyl fluoride sealed under vacuum. After remaining in a steam bath for 15 hours, the tube was cooled, opened, and the volatile products distilled to give 4.8 g of α,α-difluoroethyl isocyanate, boiling at 20°–22°.

EXAMPLE 3

α,α-Difluoropropyl Isocyanate

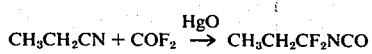
$$CH_3CH_2CN + COF_2 \xrightarrow{HgO} CH_3CH_2CF_2NCO$$

A pressure vessel was charged with 1 g of mercuric oxide, 25 g of propionitrile, and 45 g of carbonyl fluoride, closed and the contents heated at 90° for 2 hours, then 120° for 8 hours, cooled, opened and 37 g of α,α-difluoropropyl isocyanate isolated by distillation, boiling at 73°–77°. IR (gas): 3000, 2290 (NCO), 1440 cm$^{-1}$.

EXAMPLE 4

α,α-Difluorobutyl Isocyanate

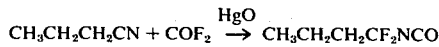
$$CH_3CH_2CH_2CN + COF_2 \xrightarrow{HgO} CH_3CH_2CH_2CF_2NCO$$

A pressure tube was charged with 1.0 g of mercuric oxide, 30 g of butyronitrile, and 45 g of carbonyl fluoride. The tube was sealed and heated with its contents at 120° for 10 hours, cooled, the contents transferred to a flask and distilled to give 36 g of α,α-difluorobutyl isocyanate as a colorless liquid, boiling at 85°–91° and identified by the physical properties, PMR (neat): 0.8–2.3 ppm complex multiplet; FMR (neat): –65 ppm (triplet, J = 12 Hz).

EXAMPLE 5

α,α-Difluoroisobutyl Isocyanate

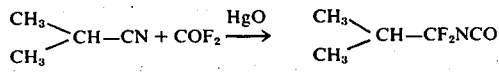

A Hastelloy pressure vessel was charged with 1.0 g of mercuric oxide, 30 g of isobutyronitrile and 30 g of carbonyl fluoride. The vessel was heated at 120° (internal temperature) for 10 hours, cooled, the contents removed and distilled to give 34 g of a colorless liquid identified as α,α-difluoroisobutyl isocyanate, boiling at 69°–74°; IR (gas), 3000, 2290 (NCO), 1430, 1225, 1105, 1050, 1025, 990 cm$^{-1}$.

EXAMPLE 6

α,α-Difluoroisobutyl Isocyanate

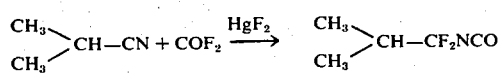

A Hastelloy pressure vessel was charged with 1 g of mercuric fluoride, 17 g of isobutyronitrile and 33 g of carbonyl fluoride. The vessel was heated at 50° for 20 hours, cooled, and the contents removed and shown to be almost pure α,α-difluoroisobutyl isocyanate by the large band at 2290 cm$^{-1}$ (NCO), and very small 2240 cm$^{-1}$ band (CN) in gas IR.

EXAMPLE 7

α,α-Difluorobenzyl Isocyanate

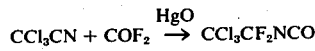

A Hastelloy pressure vessel was charged with 1 g of mercuric flouride, 20 g of benzonitrile, and 33 g of carbonyl fluoride. The vessel was heated at 120° for 1 hour and then 180° for 10 hours. The liquid product mixture was removed and examined by liquid phase IR spectroscopy. The presence of α,α-difluorobenzyl isocyanate was shown by the strong band at 2290 cm$^{-1}$ (NCO). A nitrile band at 2250 cm$^{-1}$ evidenced an unreacted nitrile. Exposure to methanol caused the 2290 cm$^{-1}$ band to disappear and an ester carbonyl band at 1720 cm$^{-1}$ to appear.

EXAMPLE 8

α,α-Difluorotrichloroethyl Isocyanate $$CCl_3CN + COF_2 \xrightarrow{HgO} CCl_3CF_2NCO$$

A Hastelloy pressure vessel was charged with 1 g of mercuric oxide, 14 g of trichloroacetonitrile, and 20 g of carbonyl fluoride. The vessel was heated at 130° for 12 hours, cooled, and the contents removed. Distillation yielded 18 g of colorless α,α-difluorotrichloroethylisocyanate, boiling at 97°–98°; IR (gas): 2300 (NCO), 1445, 1180, 1150, 1100 cm$^{-1}$; FMR (neat): –78 ppm (singlet).

EXAMPLE 9

Pentafluoroethyl Isocyanate

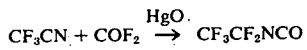

A Hastelloy pressure vessel was charged with 1 g of mercuric oxide, 25.5 g of trifluoroacetonitrile, and 35 g of carbonyl fluoride. The vessel was heated at 110° for 1 hour and then 140° for 10 hours. The vessel was cooled and the products transferred into a distillation apparatus under vacuum. Distillation gave 34 g of pentafluoroethyl isocyanate as a colorless liquid, boiling at –8° to 0°; IR (gas): 2300 (NCO), 1460, 1350, 1240, 1140, 1050 cm$^{-1}$.

EXAMPLE 10

α,α-Difluoro-β-chloroethyl Isocyanate $$ClCH_2CN + COF_2 \xrightarrow{HgO} ClCH_2CF_2NCO$$

A Hastelloy pressure vessel was charged with 1.5 g of mercuric oxide, 65 g of chloroacetonitrile, and 95 g of carbonyl fluoride. The vessel was heated at 120° for 13 hours. The product mixture was distilled to give 61 g of α,α-difluoro-β-chloroethyl isocyanate as a colorless liquid boiling at 68°–78°; IR (gas): 2280 (NCO), 1440, 1230, 1120, 1060 cm$^{-1}$; PMR (neat): 2.84 ppm (triplet, J = 9 Hz): FMR (neat): –71 ppm (triplet, J = 9 Hz).

EXAMPLE 11

(2,2,3,3-Tetrafluorocyclobutyl)difluoromethyl Isocyanate

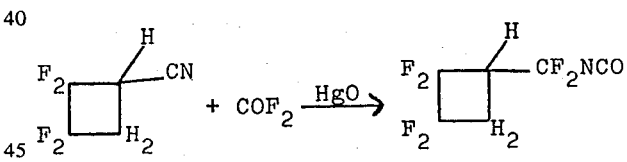

A Hastelloy pressure vessel was charged with 1 g of mercuric oxide, 25 g of 2,2,3,3-tetrafluorocyclobutane-1-carbonitrile, and 25 g of carbonyl fluoride. The vessel was heated at 140° for 12 hours and the product removed and distilled to give 21 g of 2,2,3,3-tetrafluorocyclobutyldifluoromethyl isocyanate as a colorless liquid, boiling at 136°; IR (gas): 2290 (NCO), 1440, 1370, 1290, 1225 cm$^{-1}$.

I claim:

1. In the manufacture of an α,α-difluoroisocyanate of the formula RCF$_2$NCO by the reaction of an organic nitrile of the formula RCN with carbonyl fluoride wherein R is an alkyl, cycloalkyl, aryl, or aralkyl group containing up to 20 carbon atoms and which can be substituted with F, Cl, or Br, the improvement comprising conducting the reaction at a temperature of about 50°–250°C. in the presence of a catalytic amount of mercuric oxide or mercuric fluoride.

2. Process of claim 1 wherein the temperature is from 50° to 130°C.

3. Process of claim 2 wherein the catalyst is mercuric oxide.

4. Process of claim 2 wherein the catalyst is mercuric fluoride.

* * * * *